United States Patent [19]
Welsch

[11] Patent Number: 4,799,232
[45] Date of Patent: Jan. 17, 1989

[54] GAS LASER AND METHOD
[75] Inventor: Wolfgang Welsch, Baldham, Fed. Rep. of Germany
[73] Assignee: Siemens Aktiengesellschaft, Berlin and Munich, Fed. Rep. of Germany
[21] Appl. No.: 78,185
[22] Filed: Jul. 27, 1987
[30] Foreign Application Priority Data
Sep. 24, 1986 [DE] Fed. Rep. of Germany ....... 3632502
[51] Int. Cl.$^4$ ................................................. H01S 3/03
[52] U.S. Cl. ...................................... 372/61; 372/107; 372/65
[58] Field of Search ..................... 372/61, 107, 65, 98, 372/108

[56] References Cited
U.S. PATENT DOCUMENTS
4,081,762  3/1978  Golser et al. ..................... 372/61
4,651,324  3/1987  Prein et al. ........................ 372/61

Primary Examiner—Léon Scott, Jr.
Attorney, Agent, or Firm—Hill, Van Santen, Steadman & Simpson

[57] ABSTRACT

A gas laser includes a glass bulb, end-face end pieces of sintered glass, a laser capillary, and mirror mounts fused to one another by glass solder. A method is also disclosed for manufacturing such gas laser, which is particularly suited for lasers of high light yield with high thermal stability.

7 Claims, 1 Drawing Sheet

GAS LASER AND METHOD

BACKGROUND OF THE INVENTION

1. Field of the Invention

The present invention relates generally to a gas laser having a discharge vessel within which is mounted a laser capillary.

2. Description of the Related Art

A gas laser is disclosed in German patent no. 25 06 707, and corresponding U.S. Pat. No. 4,081,762. The disclosed gas laser includes a laser tube of glass closed with metal end caps, the temperature coefficient of the metal end caps generally being matched to that of the laser tube. The metal end caps are less sensitive than the end sections of glass previously employed in gas lasers, and can accommodate mechanical stresses which arise, for example, from adjustment of the laser mirror.

However, the metal end caps can also transmit stresses to the glass tube with such intensity that breakage occurs at the junction. The metal caps, moreover, are subject to asymmetrical deformations during temperature fluctuations as a consequence of bushings, as well as pump stems which are connected to the metal caps. The asymmetrical deformations lead to misadjustment of the laser beam and, thus, to a considerable energy loss. As consequence of any different coefficients of expansion of the glass tube and the metal caps, changes in power during a warm-up period, which can last for up to fifteen minutes, are extremely disturbing for use in many applications.

The use of end pieces of sintered glass are known, for example, in flash bulbs.

SUMMARY OF THE INVENTION

An object of the present invention is to reduce temperature dependency of laser output power and to avoid injurious stresses in a gas laser as well as to increase yield in a set manufacturing process.

This and other objects are achieved in a gas laser having end pieces of sintered glass connected to the glass bulb, or tube, of the discharge vessel. In accordance with the principles of the present invention, end pieces of sintered glass not only can be made vacuum-tight, but also exert very little stress on the tube during assembly and adjustment of the mirrors. Furthermore, sintered glass end pieces exhibit both a sensitivity to mechanical stresses and guarantee a long-lasting, very precise fixing of the laser capillary and the mirror mounts.

Particular advantages are realized in an embodiment of the present gas laser in which the glass tube, the end piece and the capillary are all composed of the same type of glass. The end piece is again formed of sintered glass. In this embodiment, the temperature coefficients match one another exactly and the individual parts can be directly fused to one another.

An especially low sensitivity to temperature fluctuations and an extremely high precision of the mirror adjustment and thus resulting very high yield of the laser emission are thereby provided. For the types of glass suitable for use in the present gas laser, melting temperatures of approximately 500° C. are used for joining the individual parts. Given this low temperature, tempering of the present device is superfluous when all parts of the laser are to be fused to one another in a single work step. Temperature-independence and beam precision are noticeably better in the above described embodiment than when even the best metal caps available are used.

A further improvement lies in the absence of a pump stem on the gas laser by having at least one surface of the end pieces of sintered glass that is fused vacuum-tight after assembly of the present device. This avoids slight asymmetries produced by a pump stem and the resulting positional changes in the optical parts during temperature fluctuations. Thus, there is no longer power instabilities during the warm-up period.

The mirrors for the gas laser are in mounts advantageously composed of thin-walled tubes with a partially thick-wall portion forming an annular grove. The thin-walled tube can be inserted and fused into a corresponding bore in the end pieces without introduction of disturbing stresses. The thick-walled portions having the annular groove enable the mirror to be adjusted in a known way. For fixing an exact position of the mirror, the thick-walled portion includes a step to a thin-walled end region, and a thin-wall tube is inserted into this end region and soldered thereon so that the thin-walled tube lies against the step.

A manufacturing method for the present invention provides an especially favorable improvement when the laser is equipped with an aluminum cathode. The laser receives end pieces which are free of pump stems and which are composed of gas-permeable sintered glass. The end pieces without pump stems, the glass tube, the laser capillaries and the mounts are fused or soldered to one another in a single work step. Oxygen is subsequently admitted and the aluminum cathode disposed within the glass tube or bulb is oxidized thereby. The oxygen is suctioned off and a laser gas is admitted, and then at least one gas-permeable surface of the end piece is fused smooth and vacuumed-tight so that the tube or bulb is thereby rendered gas-tight.

The above method can be executed with particular advantage when a plurality of gas lasers are being formed in the same vacuum vessel. Sintered glass which is not tightly fused allows adequate gas to pass so that the gas interchange occurs without difficulty. By a brief elevation in the temperature of the outer surface of the laser vessels, the sintered glass is ensured of having a vacuum-tight fused surface in a simple way. It is preferred in this method that the end pieces be of a relatively great thickness, at least compared to the outside diameter of the laser capillaries.

A further advantageous possibility for manufaturing gas lasers of the present invention is in utilizing glass solder for fastening the glass parts. In particular, a manufacturing method for gas lasers for having an aluminum cathode disposed within a glass bulb includes, first, hard soldering metal parts to one another, wherein the capillaries are fixed in position relative to the glass bulb. All parts of the bulb and corresponding glass solder rings are stacked on top of one another in a soldering apparatus in their proper positions. Oxygen for oxidizing the aluminum cathode is blown in, or let in, and then suctioned off while the assembled parts are in the stacked position. A laser gas is thereafter admitted and the overall arrangement is heated to the soldering temperature of the glass solder rings so that all glass soldering is carried out in a single work step to produce a vacuum-tight gas laser.

The force of gravity of the parts of the laser vessel stacked on top of one another is sufficient to guarantee a vacuum-tight soldering of the vessel parts. The described method enables short glass bulbs to be used which hold the capillaries in a mechanically favorable position. Additional support for the capillaries can be omitted even when they are of a relatively great structural length. This is provided by the capability of the glass solder to absorb mechanical stresses without a risk of breakage, the glass solder being able to absorb considerably higher stresses than other structural forms of laser tubes.

DESCRIPTION OF THE PREFERRED EMBODIMENTS

Figure 1:
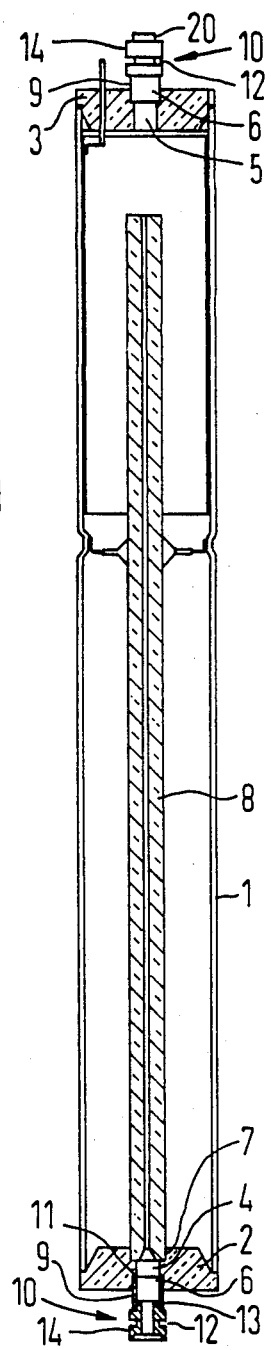
FIG. 1 is longitudinal cross section of a gas laser discharge vessel according to the principles of the present invention.

In FIG. 1 is shown a gas discharge vessel of a gas laser composed of a glass bulb 1 and of end pieces 2 and 3. The end pieces 2 and 3 are of a sintered glass and include bores 4 and 5. The end pieces 2 and 3 are connected to the glass bulb in a vacuum-tight fashion with glass solder. The glass solder absorbs stresses which arise as a consequence of slight differences in the coefficients of temperature expansion between the end pieces 2 and 3 and the glass bulb 1. Each of the end pieces 2 and 3 include a widened outer region 6 of the bores 4 and 5 into which a thin-walled part 9 of a mirror mount 10 is inserted. The thin-walled part 9 lie against a step 11 at the end of the respective, widened outside regions 6. The thin-walled part 9 are connected to the end pieces 2 and 3 by glass-metal fusing. A particularly thick-walled part 14 including an annular groove 12 is connected to the thin-walled part 9 of the mount 10. Mirror adjustment is possible by deforming the mount 10 in the region of the annular groove 12. An end region 13 of the partially thick-walled part 10 is thin-walled and has a relatively small outside diameter. The thin-walled part 9 is in the shape of a tube and is slipped onto the region 13 and hard soldered.

A laser capillary 8 is inserted into a widened portion 7 of the bore 4 at one side and is soldered to the end piece 2 with glass solder. All glass solder connections are carried out in a single soldering procedure when the required glass solder is introduced in the form of glass solder rings during essembly of the individual parts.

An advantageous embodiment of the invention includes the glass bulb 1, the end pieces 2 and 3, and the laser capillary 8 composed of the same type of glass. In this embodiment, the use of glass solder is omitted and the individual parts are joined by glass fusing.

At least on the surface, the end pieces 2 and 3 are fused smooth to such a degree that they close the laser bulb 1 vacuum-tight. For at least one of the end pieces 2 or 3, this smooth fusing is delayed until the various glass parts have been soldered or fused to one another. The outer surface of the at least one end piece 2 or 3 is thereby particularly well suited for a final smooth-fusing since heat can be applied externally in a simple way. For the type of glass coming into consideration here, a melting point of, for example, 500° C. accomplishes the smooth-fusing without difficulty and without risk after the mount 10 has been inserted. Thus, the metal-glass fusing to the mount 10 is simultaneously accomplished.

Before smooth-fusing, the corresponding end piece 2 and/or 3 is so porous and gas-permeable that gas can be suctioned out of the bulb 1 through the end piece 2 or 3 without difficulty and then can be let in again. In this case, a manufacturing method is advantageously utilizable wherein a great plurality of laser bulbs is accomodated within a compartment (not shown) and is first exposed to an oxygen atmosphere for oxidizing the aluminum cathode in a standard way. The oxygen is then pumped off following the desired oxidation, and the laser gas is then admitted. Finally, smooth-fusing of the end pieces 2 and 3 occurs in the laser gas atmosphere. For this method, it is possible to manufacture laser tubes of the described species which are free of pump stems. Such laser tubes are especially insensitive to temperature fluctuations since asymmetry of the end pieces is eliminated, the asymmetry being produced in the known laser tubes by the required pump stems.

Figure 2:
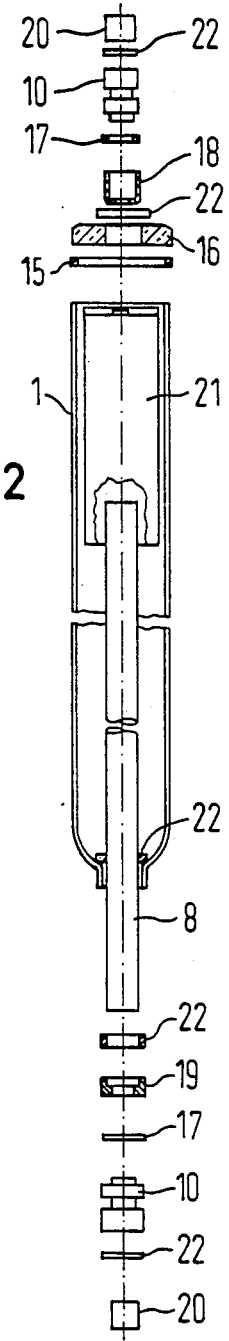
FIG. 2 is an exploded view of a second embodiment of the present gas laser.

Referring now to FIG. 2, an example of a gas laser of the present invention is shown in exploded view. A glass solder ring 15 and an end piece 16 of sintered glass without a pump stem follow an end face of the glass bulb 1. Metal parts, namely a metal tube 18, a hard solder ring 17, and a mount 10, and at another end a metal cap 19, a hard solder ring 17, and a mount 10 are soldered to one another in advance. One respective glass solder ring 22 serves to fasten the mirror 20, the metal tube 18 and the metal cap 19 to the neighboring parts and to fasten the capillary 8 in the glass tube 1.

All parts of the laser tube are stacked on top of one another in their proper positions in the preferred method, the parts being stacked in a soldering apparatus which is not shown. Glass soldering is then executed in one work step. The capillary 8 is thereby held in the desired position relative to the glass tube 1 by a clamp mechanism (not shown).

Oxygen for oxidizing an aluminum cathode 21 is blown in and then pumped out and then the laser gas is admitted. The gas exchange required for this occurs through residual gaps existing between the glass solder rings 15 and 22 and the adjacent parts. Subsequently, the arrangement is heated to a soldering temperature for the glass solder rings 15 and 22 so that all glass soldering is carried out in a single work step. The soldering temperature is perferably about 500° C. Gravity adequately presses the parts against one another so that a vacuum-tight seal arises from the glass soldering.

The structure of the present gas laser of the invention considerably boosts effieciency due to the optimum adjustment of the mirrors, since the mirror adjustment does not subsequently change and since the highest degree of insensitivity to temperature fluctuations is achieved. Simultaneously, a cost-beneficial manufacturing method for the present laser is provided, particularly allowing simultaneous fabrication of a plurality of lasers in one and the same vacuum furnace.

Although other modifications and changes may be suggested by those skilled in the art, it is the intention of the inventor to embody within the patent warranted hereon all changes and modifications as reasonably and properly come within the scope of his contribution to the art.

I claim:

1. A discharge vessel for a gas laser, comprising:
a vacuum-tight glass bulb having an outer wall;
a laser capillary rigidly connected to said discharge vessel at a first end of said glass bulb;
a first optical part secured to a first mount, said first mount including a bore extending coaxially with said laser capillary;

an end piece closing said glass bulb at one end, said end piece having a bore coaxially aligned with said laser capillary, said end piece being of sintered glass having a low sensitivity to temperature fluctuations and being connected to said glass bulb in vacuum-tight fashion;

a second mount aligned with and positioned at an end of said capillary opposite to said first mount and bearing a second optical part; and said first mount comprising a thin walled part connected to said end piece, said first optical part secured in said first mount being a mirror.

2. A discharge vessel at claimed in claim 1, wherein said glass bulb and said end piece and said capillary are of the same type of glass.

3. A discharge vessel as claimed in claim 1, wherein at least one surface of said end piece is fused vacuum-tight after assembly.

4. A discharge vessel as claimed in claim 1, wherein said first mount is a thin-walled tube having a thick-walled portion forming an annular groove.

5. A discharge vessel as claimed in claim 4, wherein said thick-walled portion provides a diameter step to a thin-walled end region, and said thin-walled tube is slipped onto said thin-walled end region and is soldered on and pressure against said diameter step.

6. A discharge vessel as claimed in claim 1, further comprising:

glass solder connecting said end piece and said optical parts and said capillary to respective adjoining parts of said glass bulb;

said glass bulb having an end region at one end of reduced diameter, said end region being connected to said capillary by said glass solder; and said capillary projecting beyond said glass bulb.

7. A discharge vessel as claimed in claim 1, further comprising:

a second end piece vacuum-tightly closing a second end of said glass bulb, said second end piece being of sintered glass and bearing said second mount.

* * * * *